United States Patent
Van Baak et al.

(10) Patent No.: US 8,758,954 B2
(45) Date of Patent: Jun. 24, 2014

(54) PROCESS FOR PREPARING MEMBRANES

(75) Inventors: Willem Johannes Van Baak, Tilburg (NL); Johannes Adrianus Wilhelmus Van Engelen, Tilburg (NL); Dana Manuela Sterescu, Tilburg (NL)

(73) Assignee: Fujifilm Manufacturing Europe B.V. (NL)

( * ) Notice: Subject to any disclaimer, the term of this patent is extended or adjusted under 35 U.S.C. 154(b) by 675 days.

(21) Appl. No.: 12/999,252

(22) PCT Filed: Jun. 19, 2009

(86) PCT No.: PCT/GB2009/050702
§ 371 (c)(1),
(2), (4) Date: Dec. 15, 2010

(87) PCT Pub. No.: WO2010/007399
PCT Pub. Date: Jan. 21, 2010

(65) Prior Publication Data
US 2011/0097645 A1    Apr. 28, 2011

(30) Foreign Application Priority Data
Jul. 18, 2008 (GB) .................................. 0813227.6

(51) Int. Cl.
*C08F 20/10* (2006.01)

(52) U.S. Cl.
USPC ............................. 429/492; 521/27; 204/632

(58) Field of Classification Search
USPC ............................. 429/492; 521/27; 204/632
See application file for complete search history.

(56) References Cited

U.S. PATENT DOCUMENTS

| 4,171,409 A | | 10/1979 | Loeb |
| 4,434,249 A | * | 2/1984 | Ballestrasse et al. ........... 521/27 |
| 4,587,269 A | | 5/1986 | Thomas, Jr. |
| 4,822,471 A | | 4/1989 | MacDonald |
| 4,923,611 A | | 5/1990 | Hanada et al. |
| 4,961,853 A | | 10/1990 | Itoh et al. |
| 5,037,858 A | | 8/1991 | MacDonald |
| 5,045,171 A | * | 9/1991 | MacDonald .................. 204/630 |
| 5,203,982 A | | 4/1993 | MacDonald |
| 5,264,125 A | | 11/1993 | MacDonald et al. |
| 5,354,903 A | | 10/1994 | MacDonald |
| 5,510,394 A | | 4/1996 | Hodgdon |

(Continued)

FOREIGN PATENT DOCUMENTS

| FR | 2 494 702 | 5/1982 |
| GB | 860 405 | 2/1961 |

(Continued)

OTHER PUBLICATIONS

M. Turek, et al., "Renewable energy by reverse electrodialysis", Desalination 205 (2007), pp. 67-74.

(Continued)

*Primary Examiner* — Peter D. Mulcahy
(74) *Attorney, Agent, or Firm* — Banner & Witcoff, Ltd.

(57) ABSTRACT

Membranes and processes for preparing membranes having weakly acidic or weakly basic groups comprising the steps of: (i) applying a curable composition to a support; (ii) curing the composition for less than 30 seconds to form a membrane; and (iii) optionally removing the membrane from the support; wherein the curable composition comprises a crosslinking agent having at least two acrylic groups. The membranes are particularly useful for producing electricity by reverse electrodialysis.

19 Claims, 1 Drawing Sheet

(56) References Cited

U.S. PATENT DOCUMENTS

| | | | |
|---|---|---|---|
| 6,258,276 B1 * | 7/2001 | Mika et al. | 210/638 |
| 7,247,270 B2 | 7/2007 | Hu et al. | |
| 7,604,746 B2 | 10/2009 | Childs et al. | |
| 7,910,520 B2 * | 3/2011 | Van Baak et al. | 503/227 |
| 8,231,710 B2 * | 7/2012 | Kase et al. | 95/45 |
| 2003/0171443 A1 | 9/2003 | Erbacher | |
| 2004/0266895 A1 | 12/2004 | Callahan et al. | |
| 2005/0238937 A1 | 10/2005 | Oren et al. | |
| 2006/0263659 A1 | 11/2006 | Cho et al. | |
| 2007/0224480 A1 | 9/2007 | Yoshida et al. | |
| 2008/0182043 A1 * | 7/2008 | van Baak et al. | 428/32.11 |

FOREIGN PATENT DOCUMENTS

| | | |
|---|---|---|
| GB | 1 163 686 | 9/1969 |
| GB | 2 174 619 | 11/1986 |
| GB | 2 390 042 | 12/2003 |
| JP | 55-000418 | 6/1974 |
| JP | 10-36625 | 2/1989 |
| JP | 06-271687 | 9/1994 |
| KR | 2004-0013627 | 2/2004 |
| WO | 98/17377 | 4/1998 |
| WO | 01/64342 | 9/2001 |
| WO | WO-01/64342 A1 * | 9/2001 |
| WO | 03/008078 | 1/2003 |
| WO | 2004/073843 | 9/2004 |
| WO | 2005/102503 | 11/2005 |
| WO | WO-2010/007399 A1 * | 1/2010 |

OTHER PUBLICATIONS

K. van den Ende, et al., "Blue Energy", KEMA Consulting, Briefing Paper, Oct. 2007.

International Search Report received for corresponding International application PCT/GB2009/050702 mailed Jul. 9, 2009.

International Preliminary Report received for corresponding International application PCT/GB2009/050702, mailed Jul. 22, 2010.

* cited by examiner

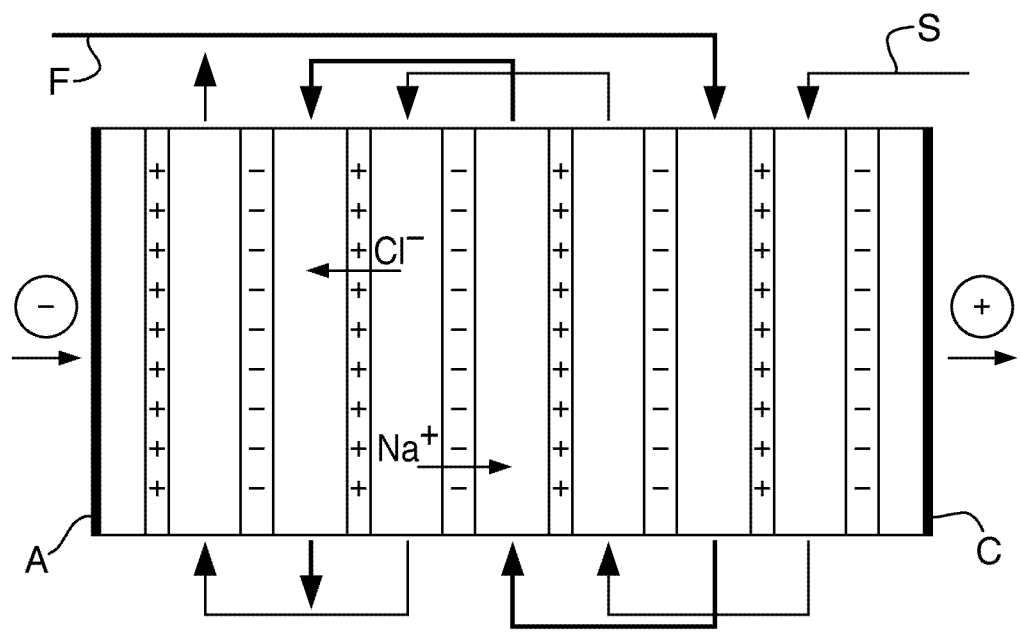

PROCESS FOR PREPARING MEMBRANES

This invention relates to membranes, to a process for their preparation and to the use of such membranes, e.g. in reverse dialysis.

Global warming and high fossil fuel prices have accelerated interest in renewable energy sources. The most common sources of renewable energy are wind power and solar power. Harvesting wind power using turbines is increasingly common, although many regard the turbines as unsightly and they are ineffective in low wind and on very windy days. Solar power is also weather dependent and not particularly efficient in countries far from the hemisphere.

The principle of using reverse electrodialysis (RED) to generate power from seawater and fresh water was described for the first time in 1954 by R. Plattle in Nature. Experimental results were obtained in America and Israel in the seventies. U.S. Pat. No. 4,171,409 is an early example of innovation in this field. KEMA in the Netherlands revived the investigation into RED in 2002 under the name "blue energy", winning the Dutch Innovation Award for 2004 in the category "Energy and Environment". In the Netherlands there is a particular interest in this technology due to the abundant supply of fresh/brackish water and salty water in close proximity.

The use of RED to produce electricity was discussed in the paper by Turek et al, Desalination 205 (2007) 67-74. Reverse dialysis (RED) gets its name from the fact that it is the reverse of conventional dialysis—instead of using electricity to desalinate sea water, energy is generated from the mixing of salty water with less salty water (typically sea water with fresh or brackish water). Djugolecki et al, J. of Membrane Science, 319 (2008) 214-222 discussed the most important membrane properties for RED.

In RED two types of membrane are used, namely one that is selectively permeable for positive ions and one that is selectively permeable for negative ions. Salt water isolated from fresh water between two such membranes will lose both positive ions and negative ions which flow through the membranes and into the fresh water. This charge separation produces a potential difference that can be utilized directly as electrical energy. The voltage obtained depends on factors such as the number of membranes in a stack, the difference in ion concentrations across the membranes, the internal resistance and the electrode properties. A flow chart schematically showing the passage of fresh/brackish water and salty sea water through a reverse electrodialysis unit comprising anionic and cationic membranes and the flow of sodium and chloride ions is attached as FIG. 1. In FIG. 1, F and S represent the flow of fresh/brackish and salty water respectively. A and C represent an anode and cathode respectively. $Cl^-$ and $Na^+$ represent the passage of chloride and sodium ions respectively through the membranes.

For all its potential benefits, a significant obstacle to the commercial use RED to generate energy is the high price of the necessary anionic and cationic membranes. Hitherto the price of the membranes has been a major factor in the final high kWh price. Turek concluded that prognosis for reducing membrane costs to the level necessary for making sea/fresh water RED energy generation commercially viable was not good. Therefore membrane cost reduction represents a significant obstacle to the commercial implementation of blue energy. Since the Turek article, the cost of fossil fuels has increased dramatically.

U.S. Pat. No. 4,923,611 describes a process for preparing ion exchange membranes for conventional (as opposed to reverse) electrodialysis. The process was slow and energy intensive, requiring 16 hours to cure the membrane and temperatures of 80° C. Similarly the processes used in U.S. Pat. No. 4,587,269 and U.S. Pat. No. 5,203,982 took 17 hours at 80° C.

GB 860,405 describes a process for making permselective membranes by, for example, electron beam cure for an unspecified period.

GB 1,163,686 describes the preparation of heterogenous ion exchange membranes. The cure was slow and consumed significant energy.

BRIEF DESCRIPTION OF THE DRAWING

The foregoing and other features and advantages of the present embodiments will be more fully understood from the following detailed description of illustrative embodiments taken in conjunction with the accompanying drawing in which:

FIG. 1 is a schematic showing the passage of fresh/brackish water and salty sea water through a reverse electrodialysis unit comprising anionic and cationic membranes and the flow of sodium and chloride ions.

The present invention seeks to provide a cost effective process for providing membranes, particularly for use in RED and for the generation of blue energy.

According to a first aspect of the present invention there is provided a process for preparing a membrane having weakly acidic or weakly basic groups comprising the steps of:
 (i) applying a curable composition to a support;
 (ii) curing the composition for less than 30 seconds to form a membrane; and
 (iii) optionally removing the membrane from the support;
wherein the curable composition comprises a crosslinking agent having at least two acrylic groups.

Hitherto membranes have generally been made in slow and energy intensive processes, often having many stages. The present invention enables the manufacture of membranes in a simple process that may be run continuously for long periods of time to mass produce membranes relatively cheaply.

The membrane is preferably an anion exchange membrane or a cation exchange membrane.

The thickness of the membrane, including the support if not removed, is preferably less than 200 µm, more preferably between 10 and 150 µm, most preferably between 20 and 100 µm.

Preferably the membrane has an ion exchange capacity of at least 0.3 meq/g, more preferably of at least 0.5 meq/g, especially more than 1.0 meq/g, based on the total dry weight of the membrane and any porous support and any porous strengthening material which remains in contact with the resultant membrane. Ion exchange capacity may be measured by titration as described below in the examples section.

Preferably the membrane has a charge density of at least 20 meq/m$^2$, more preferably at least 30 meq/m$^2$, especially at least 40 meq/m$^2$, based on the area of a dry membrane. Charge density may be measured as described above for ion exchange capacity.

Preferably the membrane has a permselectivity for small anions such as $Cl^-$ of more than 75%, more preferably of more than 80%, especially more than 85% or even more than 90%. Preferably the membrane has a permselectivity for small cations such as $Na^+$ of more than 75%, more preferably of more than 80%, especially more than 85% or even more than 90%.

Preferably the membrane has an electrical resistance less than 10 ohm/cm$^2$, more preferably less than 5 ohm/cm$^2$, most preferably less than 3 ohm/cm$^2$. Preferably the membrane exhibits a swelling in water of less than 50%, more preferably less than 20%, most preferably less than 10%. The degree of swelling can be controlled by selecting appropriate parameters in the curing step.

The water uptake of the membrane is preferably less than 50% based on weight of dry membrane, more preferably less than 40%, especially less than 30%.

Electrical resistance, permselectivity and % swelling in water may be measured by the methods described by Djugolecki et al, J. of Membrane Science, 319 (2008) on pages 217-218.

Typically the membrane is substantially non-porous e.g. the pores are smaller than the detection limit of a standard Scanning Electron Microscope (SEM). Thus using a Jeol JSM-6335F Field Emission SEM (applying an accelerating voltage of 2 kV, working distance 4 mm, aperture 4, sample coated with Pt with a thickness of 1.5 nm, magnification 100,000×, 3° tilted view) the average pore size is generally smaller than 5 nm.

Preferably the weakly acidic or weakly basic groups present in the membrane are derived from a copolymerisable substance included in the curable composition. For example, the weakly acidic or weakly basic groups present in the membrane may conveniently be obtained by including in the curable composition a crosslinking agent having one or more groups selected from weakly acidic groups, weakly basic groups and groups which are convertible to weakly acidic or weakly basic groups. Alternatively the weakly acidic or weakly basic groups in the membrane may be obtained by including in the curable composition a curable compound having one acrylic group and one or more groups selected from weakly acidic groups, weakly basic groups and groups which are convertible to weakly acidic or weakly basic groups.

In one embodiment the curable composition comprises a crosslinking agent having two acrylic groups and one or more groups selected from weakly acidic groups, weakly basic groups and groups which are convertible to weakly acidic or weakly basic groups and the composition is free from curable compounds having one acrylic group.

The presence in the curable composition of a curable compound having one (i.e. only one) acrylic group can impart a useful degree of flexibility to the membrane. Preferably the curable compound having one acrylic group has one or more groups selected from weakly acidic groups, weakly basic groups and groups which are convertible to weakly acidic or weakly basic groups.

In a preferred embodiment the composition comprises (a) a curable compound having one acrylic group and one or more groups selected from weakly acidic groups, weakly basic groups and groups which are convertible to weakly acidic or weakly basic groups; and (b) a crosslinking agent having two acrylic groups and being free from weakly acidic groups, weakly basic groups and groups which are convertible to weakly acidic or weakly basic groups.

The curable composition may of course contain further components in addition to those specifically mentioned above. For example the curable composition optionally comprises one or more further crosslinking agents and/or one or more further curable compounds, which in each case is free from weakly acidic groups, weakly basic groups and groups which are convertible to weakly acidic or weakly basic groups. The presence of such further agents and/or compounds can be useful for reducing the total number of weakly acidic or weakly basic groups on the membrane to a particular target amount.

When the crosslinking agent or the curable compound has groups which are convertible to weakly acidic or weakly basic groups the process preferably comprises the further step of converting such groups into weakly acidic or weakly basic groups, e.g. by a condensation or etherification reaction. Preferred condensation reactions are nucleophilic substitution reactions, for example the membrane may have a labile atom or group (e.g. a halide) which is reacted with a nucleophilic compound having a weakly acidic or basic group to eliminate a small molecule (e.g. hydrogen halide) and produce a membrane having the desired weakly acidic or basic group. An example of a hydrolysis reaction is where the membrane carries side chains having ester groups which are hydrolysed to acidic groups. Preferably the crosslinking agent has three or, more preferably, two acrylic groups. In a particularly preferred embodiment the crosslinking agent has two acrylic groups and the curable compound has one acrylic group.

The said curable compound has one (and only one) acrylic group.

Acrylic groups are of the formula $H_2C=CH-C(=O)-$. Preferred acrylic groups are acrylate ($H_2C=CH-C(=O)-O-$) and acrylamide ($H_2C=CH-C(=O)-N<$) groups.

It has been found that the use of weakly acidic and weakly basic curable compounds yields membranes which are useful for reverse electrodialysis. Furthermore, such membranes may be prepared under mild process conditions (e.g. at ambient temperatures and without using extremes of pH).

Preferably the curable composition is substantially free from water (e.g. less than 5 wt %, more preferably less than 1 wt %) because this avoids the time and expense of drying the resultant membrane. The word 'substantially' is used because it is not possible to rule out the possibility of there being trace amounts of water in the components used to make the composition (because they are unlikely to be perfectly dry).

The use of weakly acidic and weakly basic curable compounds has the advantage of avoiding the need to include water in the composition and in turn this avoids or reduces the need for energy intensive drying steps in the process.

When the composition is substantially free from water the components of the composition will typically be selected so that they are all liquid at the temperature at which they are applied to the support or such that any components which are not liquid at that temperature are soluble in the remainder of the composition. Without wishing to be bound by any particular theory, the use of compounds comprising acrylic groups in the composition is believed to be important for achieving the rapid rate of cure observed in the present invention. In the abovementioned prior art which used methacrylic or vinyl benzene compounds, the cure times were much longer and the polymerisation conditions more energy intensive than for the present invention, adding significantly to the cost per $m^2$ of the resultant membranes.

To achieve a membrane with a limited swelling degree (water uptake less than 50%) the crosslinking density should not be too low. This may be achieved by using multifunctional crosslinking agents or by using difunctional crosslinking agents of which the functional groups are not very far apart, e.g. by using a compound of limited molecular weight. In one embodiment the crosslinking agents present in the composition all have a molecular weight of at most 350 per acrylic group.

Preferably the curable composition is substantially free from methacrylic compounds (e.g. methacrylate and methacrylamide compounds), i.e. the composition comprises at most 10 wt % of compounds which are free from acrylic groups and comprise one or more methacrylic groups.

The curable composition may comprise one or more than one crosslinking agent comprising at least two acrylic groups. When the curable composition comprises more than one crosslinking agent comprising at least two acrylic groups none, one or more than one of such crosslinking agents may have one or more groups selected from weakly acidic groups weakly basic groups and groups which are convertible to weakly acidic or weakly basic groups.

The curable composition may comprise none, one or more than one curable compound having one acrylic group. The curable composition preferably comprises:

(a) 10 to 99 parts in total of crosslinking agent(s) comprising two acrylic groups;
(b) 10 to 99 parts in total curable compounds having one acrylic group, at least ten of the parts having one or more groups selected from weakly acidic groups, weakly basic groups and groups which are convertible to weakly acidic or weakly basic groups;
(c) 0 to 50 parts in total of crosslinking agent(s) comprising more than two acrylic groups; and
(d) 0 to 10 parts in total of methacrylic compounds; and
(e) 0.01 to 5 parts in total of photoinitiator(s);
wherein all parts are by weight.

Component (a) is preferably present in the curable composition an amount of 30 to 90 parts, more preferably 35 to 85 parts, more especially 40 to 60 parts, wherein all parts are by weight.

Component (b) is unable to crosslink because it has only one acrylic group (e.g. one $H_2C=CHCO_2$— or $H_2C=CHCONH$— group). However it is able to react with other components present in the curable composition. Component (b) can provide the resultant membrane with a desirable degree of flexibility. It also assists the membrane in distinguishing between ions of different charges by the presence of weakly acidic or basic groups.

Generally component (a) provides strength to the membrane, while potentially reducing flexibility.

Curable compositions containing crosslinking agent(s) comprising two or more acrylic groups can sometimes be rather rigid and in some cases this can adversely affect the mechanical properties of the resultant membrane. However too much curable compound having only one acrylic group can lead to a membrane with a very loose structure. Also the efficiency of the curing can reduce when large amounts of curable compound having only one acrylic group are used, increasing the time taken to complete curing and potentially requiring inconvenient conditions therefore. Bearing these factors in mind, the number of parts of component (b) is preferably 10 to 90, more preferably 30 to 70, especially 40 to 60 parts by weight.

The presence of component (c) can also provide strength to the membrane. The presence of 3 or more crosslinkable groups also helps the formation of a three dimensional polymer network in the resultant membrane. However too much of component (c) may lead to a rigid structure and inflexibility of the membrane may result. Bearing these factors in mind, the number of parts of component (c) is preferably 0 to 30, more preferably 0 to 10, by weight.

While component (d) may be present in small amounts, methacrylic compounds often slow the curing rate and therefore make the process less efficient. Therefore the curable composition preferably comprises 0 to 10 parts, more preferably 0 to 5 parts, especially 0 to 2 parts and more especially 0 parts in total of methacrylic compounds.

The curable composition may contain other components, for example surfactants, viscosity enhancing agents, surface tension modifiers, biocides or other ingredients.

Taking the above factors into account, the curable composition preferably comprises:

(a) 40 to 60 parts in total of crosslinking agent(s) comprising two acrylic groups;
(b) 40 to 60 parts in total curable compounds having one acrylic group, at least ten of the parts having one or more groups selected from weakly acidic groups, weakly basic groups and groups which are convertible to weakly acidic or weakly basic groups;
(c) 0 to 10 parts in total of crosslinking agent(s) comprising more than two acrylic groups
(d) 0 to 5 parts in total of methacrylic compounds; and
(e) 0.01 to 5 parts in total of photoinitiator(s);
wherein all parts are by weight.

Preferably the number of parts of (a), (b), (c), (d) and (e) in the aforementioned compositions add up to 100. This does not rule out the presence of further, different components but merely sets the ratio of the mentioned components relative to each other. Crosslinking agents and curable compounds having acrylic groups are preferred because of their fast polymerisation rates, especially when using UV light to effect the polymerisation. Especially preferred crosslinking agents and curable compounds having acrylic groups are the epoxy acrylate compounds which are generally even more reactive then non-epoxy acrylate groups. Many crosslinking agents and curable compounds having acrylic groups are also easily available from commercial sources.

The network structure of the membrane is determined to a large extent by the identity of crosslinkable compounds and their functionality, e.g. the number of crosslinkable groups they contain per molecule.

Examples of suitable curable compounds having one acrylic group include dimethylaminopropyl acrylamide, 2-hydroxyethyl acrylate, polyethylene glycol monoacrylate, hydroxypropyl acrylate, polypropylene glycol monoacrylate, 2-methoxyethyl acrylate, 2-phenoxyethyl acrylate and combinations thereof. Dimethylaminopropyl acrylamide comprises a weakly basic group.

Examples of suitable crosslinking agent(s) comprising two acrylic groups include poly(ethylene glycol)diacrylate, bisphenol-A epoxy acrylate, bisphenol A ethoxylate diacrylate, tricyclodecane dimethanol diacrylate, neopentyl glycol ethoxylate diacrylate, propanediol ethoxylate diacrylate, butanediol ethoxylate diacrylate, hexanediol diacrylate, hexanediol ethoxylate diacrylate, poly(ethylene glycol-co-propylene glycol)diacrylate, poly(ethylene glycol)-block-poly(propylene glycol)-block-poly(ethylene glycol)diacrylate, a diacrylate of a copolymer of polyethylene glycol and other building blocks e.g. polyamide, polycarbonate, polyester, polyimid, polysulfone, and combinations thereof.

Preferably the composition is substantially free from divinyl benzene.

Preferably the composition is substantially free from styrene.

Examples of suitable crosslinking agent(s) comprising more than two acrylic groups include glycerol ethoxylate triacrylate, trimethylolpropane ethoxylate triacrylate, trimethylolpropane ethoxylate triacrylate, pentaerythritol ethoxylate tetraacrylate, ditrimethylolpropane ethoxylate tetraacrylate, dipentaerythrytol ethoxylate hexaacrylate and combinations thereof.

For acrylates, diacrylates, and higher-acrylates, type I photo-initiators are preferred. Examples of I photo-initiators are as described in WO 2007/018425, page 14, line 23 to page 15, line 26, which are incorporated herein by reference thereto. Especially preferred photoinitiators include alpha-hydroxyalkylphenones, such as 2-hydroxy-2-methyl-1-phenyl propan-1-one, 2-hydroxy-2-methyl-1-(4-tert-butyl-)phenylpropan-1-one, 2-hydroxy-[4'-(2-hydroxypropoxy)phenyl]-2-methylpropan-1-one, 2-hydroxy-1-[4-(2-hydroxyethoxy)phenyl]-2-methyl propan-1-one, 1-hydroxycyclohexylphenylketone and oligo[2-hydroxy-2-methyl-1-{4-(1-methylvinyl)phenyl}propanone], alpha-aminoalkylphenones, alpha-sulfonylalkylphenones and acylphosphine oxides such as 2,4,6-trimethylbenzoyl-diphenylphosphine oxide, ethyl-2,4,6-trimethylbenzoylphenylphosphinate and bis(2,4,6-trimethylbenzoyl)-phenylphosphine oxide, are preferred.

Preferably the ratio of photo-initiator to the remainder of the curable composition is between 0.0001 and 0.2 to 1, more preferably between 0.001 and 0.1 to 1, based on weight.

Steps (i) and (ii) are preferably performed at temperatures between 10 and 60° C. While higher temperatures may be used, these are not preferred because they can lead to higher manufacturing costs.

Curing in step (ii) is preferably performed by radical polymerisation, preferably using electromagnetic radiation. The source of radiation may be any source which provides the wavelength and intensity of radiation necessary to cure the composition. A typical example of a UV light source for curing is an H-bulb with an output of 600 Watts/inch (240 W/cm) as supplied by Fusion UV Systems which has emission maxima around 220 nm, 255 nm, 300 nm, 310 nm, 365 nm, 405 nm, 435 nm, 550 nm and 580 nm. Alternatives are the V-bulb and the D-bulb which have a different emission spectrum with main emissions between 350 and 450 nm and above 400 nm respectively.

When no photo-initiator is included in the curable composition, the composition can be cured by electron-beam exposure, e.g. using an exposure of 50 to 300 keV. Curing can also be achieved by plasma or corona exposure.

Curing rates may be increased by including an amine synergist in the curable composition. Suitable amine synergists are e.g. free alkyl amines such as triethylamine, methyldiethanol amine, triethanol amine; aromatic amine such as 2-ethylhexyl-4-dimethylaminobenzoate, ethyl-4-dimethylaminobenzoate and also polymeric amines as polyallylamine and its derivatives. Curable amine synergists such as ethylenically unsaturated amines (e.g. acrylated amines) are preferable since their use will give less odour due to their ability to be incorporated into the membrane by curing and also because they may contain a weakly basic group which can be useful in the final membrane. The amount of amine synergists is preferably from 0.1-10 wt. % based on the weight of polymerizable compounds in the composition, more preferably from 0.3-3 wt. %.

Where desired, a surfactant or combination of surfactants may be included in the composition as a wetting agent or to adjust surface tension. Commercially available surfactants may be utilized, including radiation-curable surfactants. Surfactants suitable for use in the composition include non-ionic surfactants, ionic surfactants, amphoteric surfactants and combinations thereof.

Preferred surfactants are as described in WO 2007/018425, page 20, line 15 to page 22, line 6, which are incorporated herein by reference thereto. Fluorosurfactants are particularly preferred, especially Zonyl® FSN (produced by E.I. Du Pont).

The permeability to ions can be influenced by the swellability of the membrane and by plasticization. By plasticization compounds penetrate the membrane and act as plasticizer. The degree of swelling can be controlled by the types and ratio of crosslinkable compounds, the extent of crosslinking (exposure dose, photo-initiator type and amount) and by other ingredients.

In one embodiment at least two of the curable compositions are coated (simultaneously or consecutively) onto the support layer. Thus coating may be performed more than once, either with or without curing being performed between each coating step. As a consequence a composite membrane may be formed comprising at least one top layer and at least one bottom layer that is closer to the support than the top layer. In this embodiment the top layer and bottom layer, together with any intervening layers, constitute the membrane and the porous support provides strength to the resultant composite membrane.

Other additives which may be included in the curable composition are acids, pH controllers, preservatives, viscosity modifiers, stabilisers, dispersing agents, inhibitors, antifoam agents, organic/inorganic salts, anionic, cationic, non-ionic and/or amphoteric surfactants and the like in accordance with the objects to be achieved.

The process of the present invention may contain further steps if desired, for example washing and/or drying the membrane. When the composition comprises curable compounds having groups which are convertible to weakly acidic or weakly basic groups the process may further comprise the step of converting the groups which are convertible to weakly acidic or weakly basic groups into weakly acidic or weakly basic groups.

Preferred weakly acidic groups are carboxy groups and phosphato groups. These groups may be in the free acid or salt form, preferably in the free acid form. Examples of acrylate compounds having weakly acidic groups include acrylic acid, beta carboxy ethyl acrylate, phosphonomethylated acrylamide. Examples of acrylamide compounds having weakly acidic groups include carboxy-n-propylacrylamide and (2-carboxyethyl)acrylamide.

Preferred weakly basic groups are secondary amine and tertiary amine groups. Such secondary and tertiary amine groups can be in any form, for example they may be cyclic or acyclic. Cyclic secondary and tertiary amine groups are found in, for example, imidazoles, indazoles, indoles, triazoles, tetrazoles, pyrroles, pyrazines, pyrazoles, pyrolidinones, triazines, pyridines, pyridinones, piperidines, piperazines, quinolines, oxazoles and oxadiazoles. Examples of acrylate compounds having weakly basic groups include N,N-dialkyl amino alkyl acrylates, e.g. dimethylaminoethyl acrylate and dimethylaminopropyl acrylate. Examples of acrylamide compounds having weakly basic groups include N,N-dialkyl amino alkyl acrylamides, e.g. dimethylaminopropyl acrylamide and butylaminoethyl acrylate.

The groups which are convertible to weakly acidic groups include hydrolysable ester groups.

The groups which are convertible to weakly basic groups include haloalkyl groups (e.g. chloromethyl, bromomethyl, 3-bromopropyl etc.). Haloalkyl groups may be reacted with amines to give weakly basic groups. Examples of compounds having groups which are convertible into weakly basic groups include methyl 2-(bromomethyl)acrylate, ethyl 2-(bromomethyl)acrylate, tert-butyl α-(bromomethyl)acrylate, isobornyl α-(bromomethyl)acrylate, 2-bromo ethyl acrylate, 2-chloroethyl acrylate, 3-bromopropyl acrylate, 3-chloropropyl acrylate, 2-hydroxy-3-chloropropyl acrylate and 2-chlorocyclohexyl acrylate.

Preferably however the curable composition comprises one or more curable compounds having one or more acrylic groups and one or more substituents selected from weakly acidic groups and weakly basic groups.

While it is possible to prepare the membrane on a batch basis using a stationary support, to gain full advantage of the invention it is much preferred to prepare the membrane on a continuous basis using a moving support. The support may be in the form of a roll which is unwound continuously or the support may rest on a continuously driven belt (or a combination of these methods). Using such techniques the curable composition can be applied to the support on a continuous basis or it can be applied on a large batch basis.

The curable composition may be applied to the porous support layer by any suitable method, for example by curtain coating, extrusion coating, air-knife coating, slide coating, nip roll coating, forward roll coating, reverse roll coating, dip coating, kiss coating, rod bar coating or spray coating. The coating of multiple layers can be done simultaneously or consecutively. For simultaneous coating of multiple layers, curtain coating, slide coating, slot die coating and extrusion coating are preferred.

Thus in a preferred process the curable composition is applied continuously to a moving support, more preferably by means of a manufacturing unit comprising a curable composition application station, an irradiation source for curing the composition, a membrane collecting station and a means for moving the support from the curable composition application station to the irradiation source and to the membrane collecting station.

The curable composition application station may be located at an upstream position relative to the irradiation source and the irradiation source is located at a an upstream position relative to the composite membrane collecting station.

In order to produce a sufficiently flowable curable composition for application by a high speed coating machine, it is preferred that the curable composition has a viscosity below 4000 mPa·s when measured at 35° C., more preferably from 1 to 1000 mPa·s when measured at 35° C. Most preferably the viscosity of the curable composition is from 1 to 500 mPa·s when measured at 35° C. For coating methods such as slide bead coating the preferred viscosity is from 1 to 100 mPa·s when measured at 35° C.

With suitable coating techniques, the curable composition may be applied to a support moving at a speed of over 15 m/min, e.g. more than 20 m/min or even higher, such as 60 m/min, 120 m/min or up to 400 m/min, can be reached.

Before applying the curable composition to the surface of the support this support may be subjected to a corona discharge treatment, glow discharge treatment, flame treatment, ultraviolet light irradiation treatment or the like, e.g. for the purpose of improving its wettability and the adhesiveness, particularly where it is intended for the support to remain in the membrane in order to provide mechanical strength.

During curing the crosslinking agent(s) polymerise to form a polymer. The curing may be brought about by any suitable means, e.g. by irradiation and/or heating, provided curing occurs sufficiently rapidly to form a membrane within the 30 seconds. If desired further curing may be applied subsequently to finish off, although generally this is not necessary.

The curing is preferably achieved thermally (e.g. by irradiating with infrared light) or by irradiating the composition with ultraviolet light or an electron beam.

For thermal curing the curable composition preferably comprises one or more thermally reactive free radical initiators, preferably being present in an amount of 0.01 to 5 parts per 100 parts of curable and crosslinkable components in the curable composition, wherein all parts are by weight.

Examples of thermally reactive free radical initiators include organic peroxides, e.g. ethyl peroxide and/or benzyl peroxide; hydroperoxides, e.g. methyl hydroperoxide, acyloins, e.g. benzoin; certain azo compounds, e.g. $\alpha,\alpha'$-azobisisobutyronitrile and/or $\gamma,\gamma'$-azobis($\gamma$-cyanovaleric acid); persulfates; peracetates, e.g. methyl peracetate and/or tert-butyl peracetate; peroxalates, e.g. dimethyl peroxalate and/or di(tert-butyl)peroxalate; disulfides, e.g. dimethyl thiuram disulfide and ketone peroxides, e.g. methyl ethyl ketone peroxide. Temperatures in the range of from about 30° C. to about 150° C. are generally employed for infrared curing. More often, temperatures in the range of from about 40° C. to about 110° C. are used.

Preferably curing of the composition begins within 60 seconds, more preferably within 15 seconds, especially within 5 seconds and most preferably within 3 seconds, of the composition being applied to the support layer.

Preferably the curing is achieved by irradiating the composition for less than 10 seconds, more preferably less than 5 seconds, especially less than 3 seconds, more especially less than 2 seconds. In a continuous process the irradiation occurs continuously and the speed at which the curable composition moves through the beam of the irradiation is mainly what determines the time period of curing time.

When high intensity UV light is used for curing a considerable amount of heat may be generated. To prevent overheating one may therefore apply cooling air to the lamps and/or the support/membrane. Often a significant dose of IR light is irradiated together with the UV-beam. In one embodiment curing is performed by irradiation using UV light filtered through an IR reflecting quartz plate.

Preferably the curing uses ultraviolet light. Suitable wavelengths are for instance UV-A (400 to >320 nm), UV-B (320 to >280 nm), UV-C (280 to 200 nm), provided the wavelength matches with the absorbing wavelength of any photo-initiator included in the composition.

Suitable sources of ultraviolet light are mercury arc lamps, carbon arc lamps, low pressure mercury lamps, medium pressure mercury lamps, high pressure mercury lamps, swirlflow plasma arc lamps, metal halide lamps, xenon lamps, tungsten lamps, halogen lamps, lasers and ultraviolet light emitting diodes. Particularly preferred are ultraviolet light emitting lamps of the medium or high pressure mercury vapour type. In addition, additives such as metal halides may be present to modify the emission spectrum of the lamp. In most cases lamps with emission maxima between 200 and 450 nm are particularly suitable.

The energy output of the irradiation source is preferably from 20 to 1000 W/cm, preferably from 40 to 500 W/cm but may be higher or lower as long as the desired exposure dose can be realized. The exposure intensity is one of the parameters that can be used to control the extent of curing which influences the final structure of the membrane. Preferably the exposure dose is at least 40 mJ/cm$^2$, more preferably between 40 and 600 mJ/cm$^2$, most preferably between 70 and 220 mJ/cm$^2$ as measured by an High Energy UV Radiometer (UV Power Puck™ from EIT—Instrument Markets) in the UV-B range indicated by the apparatus. Exposure times can be chosen freely but preferably are short and are typically less than 2 seconds.

To reach the desired dose at high coating speeds more than one UV lamp may be required, so that the curable composition is exposed to more than one lamp. When two or more lamps are applied all lamps may give an equal dose or each lamp may have an individual setting. For instance the first lamp may give a higher dose than the second and following lamps or the exposure intensity of the first lamp may be lower.

Photo-initiators may be included in the curable composition and are usually required when curing uses UV or visible light radiation. Suitable photo-initiators are those known in the art such as radical type, cation type or anion type photo-initiators.

A number of techniques may be used to provide membranes of the invention having particularly good mechanical strength. For example, the support may be selected to be a porous support and one may allow this porous support to remain in contact with the composition even after curing. Alternatively, or additionally, the process may comprise the additional step of contacting the curable composition with a porous strengthening material prior to curing (e.g. the curable composition may be applied to a porous strengthening material and/or the strengthening material may be applied to the curable composition). For this purpose suitable supports and strengthening materials are porous, e.g. they may be a woven or non-woven synthetic fabric, e.g. polyethylene, polypropylene, polyacrylonitrile, polyvinyl chloride, polyester, polyamide, and copolymers thereof, or porous membranes based on e.g. polysulfone, polyethersulfone, polyphenylenesulfone, polyphenylenesulfide, polyimide, polyethermide, polyamide, polyamideimide, polyacrylonitrile, polycarbonate, polyacrylate, cellulose acetate, polypropylene, poly(4-methyl 1-pentene), polyinylidene fluoride, polytetrafluoroethylene, polyhexafluoropropylene, polychlorotrifluoroethylene, and copolymers thereof. Commercially available porous supports and strengthening materials are available commercially, e.g. from Freudenberg Filtration Technologies (Novatexx materials) and Sefar AG. In the embodiment where a porous strengthening material is applied to the curable composition prior to curing it is preferred that the porous strengthening material allows irradiation of the wavelength used for cure to pass therethrough and/or the curable composition is allowed to soak through the porous strengthening material such that it is cured in step (iii).

Preferably the support has a hydrophilic character. Surprisingly ion exchange membranes with weakly basic or acidic groups (e.g. tertiary amino, carboxyl and phosphato groups) can exhibit good properties in terms of their permselectivity and conductivity while at the same time being not overly expensive to manufacture by the present process.

The membranes of the invention are primarily intended for use in reverse electrodialysis, especially for the generation of blue energy. However it is envisaged that the membranes have other uses, e.g. in electrodialysis and water purification applications.

The support may have the function of transporting the curable composition in the form of a thin film to a curing source.

Preferably the composition is free from compounds having tetraalkyl-substituted quaternary ammonium groups.

Preferably the composition is free from compounds having sulpho groups.

Bearing in mind the above, a preferred process according to the invention prepares an anion or cation exchange membrane and comprises the steps of:
  (i) applying a curable composition to a support;
  (ii) optionally contacting a strengthening material and the curable composition;
  (iii) curing the composition for less than 3 seconds to form a membrane having an ion exchange capacity of at least 0.3 meq/g based on the dry weight of the membrane and any support and strengthening material which are intended to remain in contact with the cured composition; and
  (iv) optionally removing the membrane from the support;
wherein the curable composition is as hereinbefore defined in relation to the first aspect of the present invention.

According to a second aspect of the present invention there is provided a polymeric membrane having weakly acidic or weakly basic groups and being suitable for use in ion exchange or reverse electrodialysis, the membrane having been obtained by a process comprising polymerisation of a curable composition as hereinbefore defined in relation to the first aspect of the present invention.

The preferences for the curable composition are as described in relation to the first aspect of the present invention.

The membranes according to a second aspect of the present invention may also be put to other uses requiring membranes having weakly acidic and/or weakly basic groups.

The membranes according to the second aspect of the present invention preferably have the properties described above in relation to the first aspect of the present invention.

The membranes according to a second aspect of the present invention are preferably obtained by a process according to the first aspect of the present invention.

According to a third aspect of the present invention there is provided use of a membrane according to the second aspect of the present invention for the generation of electricity.

According to a fourth aspect of the present invention there is provided an electrodialysis or reverse electrodialysis unit comprising at least one anode, at least one cathode and one or more ion exchange membranes according to the second aspect of the present invention. Further the unit preferably comprises an inlet for providing a flow of relatively salty water along a first side of a membrane according to the present invention and an inlet for providing a less salty flow water along a second side of the membrane such that ions pass from first side to the second side of the membrane. Preferably the one or more ion exchange membranes of the unit comprise a membrane according to the second aspect of the present invention having a weakly acidic groups and a membrane according to the second aspect of the present invention having weakly basic groups.

In a preferred embodiment the unit comprises at least 100, more preferably at least 500, membranes according to the second aspect of the present invention. Alternatively, a continuous first membrane according to the present invention having weakly acidic or basic groups may be folded in a concertina (or zigzag) manner and a second membrane having weakly basic or acidic groups (i.e. of opposite charge to the first membrane) may be inserted between the folds to form a plurality of channels along which fluid may pass and having alternate anionic and cationic membranes as side walls. Preferably the second membrane is as defined in relation to the second aspect of the present invention.

The invention will now be illustrated with non-limiting examples where all parts and percentages are by weight unless specified otherwise.

In the examples the following properties were measured by the methods described below:

The ion exchange capacity of membranes made by the process of the present invention was measured by titration as follows:

The membrane arising from the process (0.7 g wet weight) was stirred in NaCl solution (3 molar, 150 cm$^3$) for 15 hours. The resultant membrane was thoroughly rinsed with water and then stirred in Na$_2$SO$_4$ solution (1.5 molar, 50 cm$^3$) for at least 1 hour. The Na$_2$SO$_4$ solution (50 cm$^3$) was renewed twice and the 3 solutions were combined into a 250 ml flask. This solution was titrated with AgNO$_3$ solution (0.1000 molar) using a combined silver electrode (6.0404.100) on the Titroprocessor 682 from Metrohm.

The following settings were used:

| | |
|---|---|
| Titr. Rate | 1.00 ml/min |
| Anticipation | 10 |
| EP crit | 3 |

The dry weight of the membrane was determined by drying it in a vacuum oven at 30° C. for 24-48 hours.

Permselectivity was measured by using a static membrane potential measurement. Two cells are separated by the membrane under investigation. Prior to the measurement the membrane was equilibrated in a 0.5M NaCl solution for at least 16 hours. Two streams having different NaCl concentrations were passed through cells on opposite sides of the membranes under investigation. One stream had a concentration of 0.1M NaCl (from Sigma Aldrich, min. 99.5% purity) and the other stream was 0.5M NaCl. The flow rate was 0.74 liters/min. Two double junction Ag/AgCl reference electrodes (from Metrohm AG, Switzerland) were connected to capillary tubes that were inserted in each cell and were used to measure the potential difference over the membrane. The effective membrane area was 3.14 cm² and the temperature was 25° C.

When a steady state was reached, the membrane potential was measured ($\Delta V_{meas}$)

The permselectivity ($\alpha(\%)$) of the membrane was calculated according the formula:

$$\alpha(\%) = \Delta V_{meas} / \Delta V_{theor} * 100\%.$$

The theoretical membrane potential ($\Delta V_{theor}$) is the potential for a 100% permselective membrane as calculated using the Nernst equation.

Electrical resistance was measured by the method described by Djugolecki et al, J. of Membrane Science, 319 (2008) on page 217-218 with the following modifications:

the auxiliary membranes were from Tokuyama Soda, Japan;
the effective area of the membrane was 3.14 cm²;
the pumps used were Masterflex easyload II from Cole-Palmer;
the capillaries were filled with 3M KCl;
the reference electrodes were from Metrohm; and
cells 1,2,5 and 6 contained 0.5M $Na_2SO_4$.

Ebecryl™ 3703 is an amine modified bisphenol-A epoxy acrylate crosslinking agent comprising two acrylic groups obtained from UCB Chemicals. Ebecryl™ is a trade mark of UCB Chemicals.

DMAPAM is dimethylaminopropyl acrylamide, a curable compound having one acrylic group and a weakly basic group, obtained from Kohjin Chemicals, Japan.

All ingredients beginning with "SR" were from Sartomer, France.

CD536 is dioxane glycol diacrylate (Mw=256) from Sartomer. Acrylic acid was obtained from Sigma Aldrich.

Irgacure™ 500 is a photoinitiator obtained from Ciba.

Irgacure™ 819DW is an aqueous photoinitiator dispersion from Ciba.

Irgacure™ 1870 is a photoinitiator from Ciba.

Irgacure™ is a trade mark of Ciba.

Additol™ ITX is a photoinitiator from Cytec.

Zonyl® FSN100 is a non-ionic fluorosurfactant from Dupont.

Novatexx 2473 is a non woven polyethylene/polypropylene material of weight 30 g/m², thickness 0.12 mm having an air permeability of 2500l/m²/s at 200 Pa from Freudenberg Filtration Technologies.

EXAMPLE 1

A curable composition ("CC1") was prepared by mixing the ingredients shown in Table 1:

TABLE 1

| Ingredient | Amount (wt %) |
|---|---|
| Ebecryl ™ 3703 | 74.2 |
| DMAPAM | 24.8 |
| Irgacure ™ 500 | 1.0 |

Step (i)—Applying the Curable Composition to a Support

The curable composition CC1 was applied to a support (a paper extrusion coated with a polyethylene layer) to a thickness of 150 micrometers.

In this Example a strengthening material (woven SEFAR) was applied to the layer of CC1 and flattened using a 150 micrometer rod/knife coater.

Step (ii)—Curing

A membrane was prepared by curing the product of step (i) using a Light Hammer LH6 from Fusion UV Systems fitted with a D-bulb working at 100% intensity with a speed of 15 m/min (single pass). The curing time was 0.8 seconds.

The resultant membrane was removed from the support and stored for at least 12 hrs in 0.5M NaCl solution, buffered to pH 4.3.

Results:

The permselectivity ($\alpha(\%)$) of the resultant membrane as measured by the method described above was found to be 89.5%.

EXAMPLES 2 TO 11

Crosslinker Variation

Further curable compositions (CC2 to CC11) were prepared by mixing the ingredients shown in Table 2. CC2 to CC10 contained two crosslinking agents and CC11 contained one crosslinking agent. CC9 and C10 contained 32.5 wt % of dimethacrylate crosslinking agent in addition to 39.7 wt % acrylate crosslinking agent.

TABLE 2

| Ingredient | CC 2 wt % | CC 3 wt % | CC 4 wt % | CC 5 wt % | CC 6 wt % | CC 7 wt % | CC 8 wt % | CC 9 wt % | CC 10 wt % | CC 11 wt % |
|---|---|---|---|---|---|---|---|---|---|---|
| DMAPAM | 26.7 | 26.7 | 26.7 | 26.7 | 26.7 | 26.7 | 26.7 | 26.7 | 26.7 | 26.7 |
| Ebecryl ™ 3703 (amine modified bisphenol-A epoxy acrylate, Mw 850) | 39.7 | 39.7 | 39.7 | 39.7 | 39.7 | 39.7 | 39.7 | 39.7 | 39.7 | 71.7 |
| Irgacure 500 | 1.1 | 1.1 | 1.1 | 1.1 | 1.1 | 1.1 | 1.1 | 1.1 | 1.1 | 1.1 |

TABLE 2-continued

| Ingredient | CC 2 wt % | CC 3 wt % | CC 4 wt % | CC 5 wt % | CC 6 wt % | CC 7 wt % | CC 8 wt % | CC 9 wt % | CC 10 wt % | CC 11 wt % |
|---|---|---|---|---|---|---|---|---|---|---|
| SR238 (1,6-hexanediol diacrylate, Mw 226) | 32.5 | | | | | | | | | |
| SR833S (tricyclodecane dimethanol diacrylate, Mw 304) | | 32.5 | | | | | | | | |
| SR259 (polyethylene glycol diacrylate, Mw 308) | | | 32.5 | | | | | | | |
| SR344 (polyethylene glycol diacrylate, Mw 508) | | | | 32.5 | | | | | | |
| SR610 (polyethylene glycol diacrylate, Mw 708) | | | | | 32.5 | | | | | |
| SR349 (ethoxylated (3) Bisphenol A diacrylate, Mw 468) | | | | | | 32.5 | | | | |
| SR602 (ethoxylated (10) Bisphenol A diacrylate, Mw 776) | | | | | | | 32.5 | | | |
| SR206 (ethylene glycol dimethacrylate, Mw 198) | | | | | | | | | 32.5 | |
| SR252 (polyethylene glycol dimethacrylate, Mw 736) | | | | | | | | | | 32.5 |

Steps (i) and (ii)—Application to a Support and Curing

Curable Compositions CC2 to CC11 were applied to a support and cured exactly as described in Example 1, except that CC9 and CC10 were slow to cure and hence they were exposed to UV light for five 2 second periods. The resultant membrane was removed from the support.

Results

The permselectivity of the resultant membranes were measured using the methods described above. The results are as shown in Table 3:

TABLE 3

| Example | Curable Composition | Permselectivity ($\alpha$ (%)) |
|---|---|---|
| 2 | CC2 | 86.2 |
| 3 | CC3 | 88.1 |
| 4 | CC4 | 84.0 |
| 5 | CC5 | 83.7 |
| 6 | CC6 | 79.3 |
| 7 | CC7 | 90.3 |
| 8 | CC8 | 79.0 |
| 9 | CC9 | 66.6 |
| 10 | CC10 | 62.2 |
| 11 | CC11 | 87.6 |

The membrane produced in Example 9 decomposed on drying. The decomposition on drying of the membrane produced in Example 9 and a low permselectivity of the membrane produced in Example 10 indicate that the compositions containing methacrylates did not cure as quickly as the other Examples which were made free from methacrylates.

EXAMPLES 12 TO 14

Further curable compositions CC12 to CC14 were prepared according to the formulations shown in Table 4:

TABLE 4

| Ingredient | CC12 wt % | CC13 wt % | CC14 wt % |
|---|---|---|---|
| DMAPAM | 33.1 | 33.1 | 49.4 |
| Ebecryl ™ 3703 | 49.2 | 49.2 | 49.2 |
| Irgacure ™ 500 | 1.4 | 1.4 | 1.4 |
| SR238 | 16.3 | | |
| SR349 | | 16.3 | |

Membranes were prepared from curable compositions CC12 to CC14 using the method described above in Example 1 except that in place of woven Sefar there was used Novatexx 2473 and excess curable composition was removed using a 4 micron bar (i.s.o. 150).

The permselectivity and ion exchange capacity of the membranes prepared from curable compositions CC12 to CC14 were measured using the methods described above and were found to be as shown in Table 5 below:

TABLE 5

| Example | Curable Composition | Permselectivity ($\alpha$ (%)) | Ion Exchange Capacity (mmol/g) |
|---|---|---|---|
| 12 | CC12 | 87.0 | 0.93 |
| 13 | CC13 | 88.5 | 1.24 |
| 14 | CC14 | 86.0 | 0.9 |

EXAMPLES 15 TO 19

Curable compositions (CC15 to CC19) were prepared by mixing the ingredients shown in Table 6.

TABLE 6

| Ingredient | CC 15 wt % | CC 16 wt % | CC 17 wt % | CC 18 wt % | CC 19 wt % |
|---|---|---|---|---|---|
| DMAPAM | 49.25 | | 49.25 | 49.25 | 49.25 |
| SR238 | 49.25 | | | | 36.75 |
| SR833S | | | 49.25 | | 12.25 |
| CD536 | | | | 49.25 | |
| SR349 | | 49.25 | | | |
| Acrylic acid | | 49.25 | | | |

TABLE 6-continued

| Ingredient | CC 15 wt % | CC 16 wt % | CC 17 wt % | CC 18 wt % | CC 19 wt % |
|---|---|---|---|---|---|
| Irgacure ™ 500 | 1.0 | | | | |
| Irgacure ™ 819DW | | 1.0 | | | |
| Irgacure ™ 1870 | | | 0.50 | 0.50 | 1.25 |
| Additol ™ ITX | | | 0.50 | 0.50 | |
| Zonyl ® FSN100 | 0.50 | 0.50 | 0.50 | 0.50 | 0.50 |

Step (i)—Applying the Curable Compositions to a Support

The curable composition under investigation (any one of CC15 to CC19) was applied to a support (untreated PE paper carrying Novatexx 2473 as strengthening material) using a 150 micron bar rod such that the pores of the strengthening material were filled with curable composition. Excess curable composition was removed using a 4 micron bar coater.

Step (ii)—Curing

Membranes were prepared by curing the products of step (i) using a Light Hammer LH6 from Fusion UV Systems fitted with a D-bulb working at 100% intensity with a speed of 20 m/min (three passes with a 2 second gap between each pass). The cure time on each pass was 0.4 seconds to give a total cure time of 1.2 seconds.

The resultant membranes were removed from the support and stored in 0.5M NaCl solution, buffered to pH 4.3.

The membranes prepared from CC15 to CC19 had the properties shown in Table 7:

TABLE 7

| Example | Curable Compound | Permselectivity (α (%)) | Electrical resistance (ohm · cm²) |
|---|---|---|---|
| 15 | CC15 | 91.9 | 5.41 |
| 16 | CC16 | 92.0 | — |
| 17 | CC17 | 95.2 | 6.7 |
| 18 | CC18 | 95.6 | 5.6 |
| 19 | CC19 | 91.7 | 4.4 |

The invention claimed is:

1. A process for preparing a substantially non-porous membrane having weakly acidic or weakly basic groups comprising the steps of:
   (i) applying a curable composition to a support;
   (ii) curing the composition for less than 30 seconds to form a membrane; and
   (iii) optionally removing the membrane from the support;
   wherein the curable composition comprises
   (i) 10 to 99 parts in total of crosslinking agent(s) comprising two acrylic groups;
   (ii) 10 to 99 parts in total of curable compounds having one acrylic group, at least ten of which have one or more groups selected from weakly acidic groups, weakly basic groups and groups which are convertible to weakly acidic or weakly basic groups;
   (iii) 0 to 50 parts in total of crosslinking agent(s) comprising more than two acrylic groups; and
   (iv) 0 to 10 parts in total of compounds which are free from acrylic groups and comprise one or more methacrylic groups; and
   (v) 0.01 to 5 parts in total of photoinitiator(s);
   wherein the membrane is an anion exchange membrane or a cation exchange membrane and all parts are by weight and the number of parts of (i), (ii), (iii), (iv) and (v) add up to 100.

2. A process according to claim 1 wherein the curing is achieved by irradiating the composition for less than 10 seconds.

3. A process according to claim 1 wherein the said crosslinking agent(s) or the said curable compound or both the said crosslinking agent(s) and the said curable compound have one or more groups selected from weakly acidic groups, weakly basic groups and groups which are convertible to weakly acidic or weakly basic groups.

4. A process according to claim 1 which further comprises a further crosslinking agent or a further curable compound or both a further crosslinking agent and a further curable compound which in each case is free from weakly acidic groups, weakly basic groups and groups which are convertible to weakly acidic or weakly basic groups.

5. A process according to claim 1 wherein the said weakly acidic groups are selected from carboxy and/or phosphate groups and the said weakly basic groups are selected from secondary and tertiary amino groups.

6. A process according to claim 1 wherein the membrane has an ion exchange capacity of at least 0.3 meq/g based in the dry weight of the membrane.

7. A process according to claim 1 wherein the curable composition is applied to a support moving at a speed of over 15 m/min.

8. A process according to claim 1 wherein the curable composition is applied continuously to a moving support or a porous strengthening material by means of manufacturing unit comprising a curable composition application station, an irradiation source for curing the composition, a membrane collecting station and a means for moving the support porous a strengthening material from the curable composition application station to the irradiation source and to the membrane collecting station.

9. A process according to claim 1 wherein the curing is performed by irradiating the curable composition for less than 3 seconds, the weakly acidic groups are carboxy and/or phosphate groups, the weakly basic groups are secondary amine or tertiary amine groups, the composition is substantially free from methacrylates and methacrylamides and the membrane has an ion exchange capacity of at least 0.3 meq/g based on the dry weight of the membrane.

10. A process according to claim 1 wherein the curable composition is substantially free of water.

11. A polymeric membrane having weakly acidic or weakly basic groups and being suitable for use in exchange or reverse electrodialysis, the membrane having been obtained by a process comprising polymerisation of a curable composition of claim 1.

12. A process according to claim 3 wherein the said weakly acidic groups are selected from carboxy and/or phosphate groups and the said weakly basic groups are selected from secondary and tertiary amino groups.

13. A process according to claim 8 wherein the curable composition is substantially free of water.

14. A process according to claim 12 wherein the curable composition is substantially free of water.

15. A process according to claim 7 wherein the curable composition is substantially free of water and the curing is achieved by irradiating the composition for less than 10 seconds.

16. A membrane according to claim 11 wherein the curable composition is substantially free of divinyl benzene.

17. A membrane according to claim 11 wherein the said weakly acidic groups are selected from carboxy and/or phosphate groups and the said weakly basic groups are selected from secondary and tertiary amino groups.

18. An anion exchange membrane or a cation exchange membrane according to claim 1 which has a charge density of at least 20 meq/m$^2$.

19. An anion exchange membrane or a cation exchange membrane according to claim 1 wherein the curable composition is free from compounds having tetraalkyl-substituted quaternary ammonium groups and free from compounds having sulpho groups.

* * * * *